R. GARSTANG.

HEATER AND FEEDER.

No. 6,802. Reissued Dec. 14, 1875.

ATTEST,
Charles Pickles
Robt Burns

INVENTOR,
Richard Garstang
By Knight Bros.
Attys.

UNITED STATES PATENT OFFICE

RICHARD GARSTANG, OF ST. LOUIS, MISSOURI.

IMPROVEMENT IN HEATERS AND FEEDERS.

Specification forming part of Letters Patent No. 152,360, dated June 23, 1874; reissue No. 6,802, dated December 14, 1875; application filed July 29, 1875.

*To all whom it may concern:*

Be it known that I, RICHARD GARSTANG, of St. Louis, St. Louis county, State of Missouri, have invented a certain new and useful Improvement in Feed-Water Heaters, of which the following is a specification:

My improvement consists in a feed-water heater having three chambers in a vertical series. The upper and lower of these chambers communicate together by pipes passing through the middle chamber. A filter occupies the lower part of the upper chamber The exhaust steam from the engine enters the central chamber at the bottom upon one side, and the uncondensed part of the steam escapes from the upper part of the chamber, upon the other side. The feed water enters the central chamber over the steam-induction port, and escapes beneath the steam-eduction port. The water from the central chamber is pumped into the lower chamber, and in this chamber the mud subsides, and may be blown off through a blow-off pipe at the bottom. The settled water passes upward through the pipes, traversing the central chamber, and through the filter into the part of the upper chamber above the filter, and the clear water flows to the boiler through a pipe communicating with said chamber just above the level of the filter. The scum accumulates at the top of the upper chamber, and is from time to time blown out through a blow-off pipe.

Figure 1:
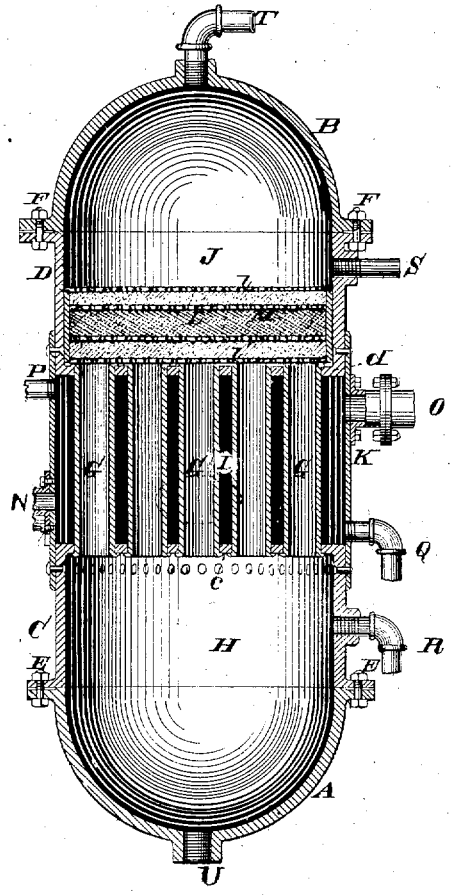
Figure 2:
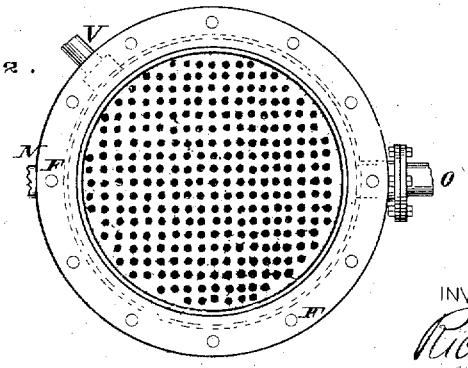

In the drawings, Figure 1 is a vertical axial section of the heater. Fig. 2 is a top view with the upper head removed.

A and B are the hemispherical heads, secured to the cylindrical castings C D by flanges and bolts E F, as shown, or in any other suitable manner. The inner ends of the parts C D consist of tube-sheets *c d*, through which pass the pipes G, that form communication between the lower chamber H and the upper chamber J. The pipes G pass vertically through the middle chamber I, and into this chamber the steam is exhausted. The tube-sheets *c d* divide the case into the three chambers H I J. The sheet-metal cylinder K forms the side wall of the central chamber I, and it is connected to the parts C D by rivets. L is the filter divided horizontally into three compartments, which slide the one into the other. The bottom of each compartment is formed of perforated metal. The top *l* and bottom *l'* of this filter are also of perforated metal. M represents the filling, which is, preferably, of animal charcoal. Said filter occupies the lower part of the chamber J. The steam, as it is exhausted from the engine, passes through pipe N into the chamber I, and all the steam that remains uncondensed, escapes through the discharge-pipe O. The feed-water from a reservoir, or other source, enters the chamber I, through a pipe, P, (over the steam-induction pipe,) and passes out through the pipe Q, augmented in quantity by the water resulting from the condensation of exhaust steam in the chamber I, and the upwardly-extending discharge-pipe O. The water from pipe Q is forced into the chamber H through a pipe, R, by a pump, (not shown.) The courses of the steam and water through the chamber I cross each other, so that the steam is condensed, and the water heated. From the chamber H the water passes up the pipes G, and through the filter L to the upper chamber J, and passes out of the chamber J through the pipe S to the boiler. At the top of the chamber J is a pipe, T, through which scum is blown off, the clear water, free from scum, flowing out through the pipe S. Much the largest proportion of the earthy matter in the water settles to the bottom of the chamber H, as the water comes to a partial rest in said chamber, and what remains in it is held back by the filter. The sediment is blown off through the pipe U. The water is drawn from the chamber I, when desired, by a pipe, V.

I claim as new and of my invention—

1. The compartments H I J, tubes or pipes G, and filter L, combined and arranged, and having pipe-connections for operating substantially in the manner described.

2. The cast-metal ends A B, and cylindrical attachments C D, provided with tube-sheets *c d*, and forming the scum and sediment chambers, respectively, in combination with the metal cylinder K, forming an intermediate chamber, I, and tubes G, connecting the upper and lower chambers or reservoirs, substantially as set forth.

3. The combination of chamber J, filter L in lower part of same, water-induction pipes G beneath the filter, and outflow-water pipe in the lower part of chamber J, above the filter, and blow-off pipe T at the top of said chamber, all substantially as set forth, and for the purpose described.

4. The condensing-chamber I, surrounding the water-tubes G, and provided with steam-inlet N and water-outlet Q at bottom, and water-inlet P and steam-outlet O at top, as set forth.

RICHARD GARSTANG.

Witnesses:
SAML. KNIGHT,
ROBT. BURNS.